US012803273B2

(12) United States Patent
Thibaut et al.

(10) Patent No.: US 12,803,273 B2
(45) Date of Patent: Nov. 17, 2026

(54) SYSTEMS AND METHODS FOR DISTRIBUTING ELECTRIC POWER FROM A POWER DISTRIBUTION UNIT TO AN ELECTRIC LOAD

(71) Applicant: OVH, Roubaix (FR)

(72) Inventors: Christophe Maurice Thibaut, Noyelles les Seclin (FR); Bastien Cecchinato, Tassin-la-Demi-Lune (FR)

(73) Assignee: OVH, Roubaix (FR)

(*) Notice: Subject to any disclaimer, the term of this patent is extended or adjusted under 35 U.S.C. 154(b) by 83 days.

(21) Appl. No.: 18/978,917

(22) Filed: Dec. 12, 2024

(65) Prior Publication Data

US 2025/0202225 A1 Jun. 19, 2025

(30) Foreign Application Priority Data

Dec. 15, 2023 (EP) .................................... 23307232

(51) Int. Cl.
*H02H 7/00* (2006.01)
*H02H 7/22* (2006.01)
*H02J 3/0012* (2026.01)

(52) U.S. Cl.
CPC ............ *H02H 7/22* (2013.01); *H02J 3/0012* (2020.01)

(58) Field of Classification Search
CPC ........................................................ H02H 7/22
See application file for complete search history.

(56) References Cited

U.S. PATENT DOCUMENTS

| | | | |
|---|---|---|---|
| 4,819,117 A | 4/1989 | Brennan et al. | |
| 6,904,373 B2 | 6/2005 | Le et al. | |
| 9,218,237 B1 | 12/2015 | Wishman | |
| 9,350,156 B2 * | 5/2016 | Kanzaki | H02H 3/08 |
| 10,197,602 B1 | 2/2019 | Nehmeh | |

(Continued)

FOREIGN PATENT DOCUMENTS

| | | |
|---|---|---|
| CN | 103891076 A | 6/2014 |
| CN | 110739663 A | 1/2020 |

(Continued)

OTHER PUBLICATIONS

European Search Report with regard to the EP 23307232.1 Patent Application No. completed Jun. 11, 2024.

*Primary Examiner* — Stephen W Jackson
(74) *Attorney, Agent, or Firm* — BCF LLP

(57) ABSTRACT

System and method for distributing electric power from a power distribution unit to an electric load are disclosed. The method includes receiving, by a monitoring circuit, electric power from a power source, the monitoring circuit being electrically connected to the electric load, connecting the electric load to a power outlet of the monitoring circuit, determining an impedance at the power outlet and, in response to an impedance being effectively measured at the power outlet, determining a status of the electric load. In response to the electric load being in the operational state, a short-circuit protection circuit of the monitoring circuit is inhibited during a given amount of time, the short-circuit protection circuit being configured to disconnect the electric load from the power distribution unit in response to a fault being detected and electric current is distributed from the power distribution unit to the electric load.

15 Claims, 5 Drawing Sheets

(56) References Cited

U.S. PATENT DOCUMENTS

| | | | | |
|---|---|---|---|---|
| 11,128,124 | B2 * | 9/2021 | Shah | H02H 1/0007 |
| 11,329,472 | B2 | 5/2022 | Roy et al. | |
| 11,719,757 | B2 | 8/2023 | Yang et al. | |
| 2005/0002140 | A1 | 1/2005 | Borrego et al. | |
| 2008/0049367 | A1 | 2/2008 | Carson et al. | |
| 2013/0100567 | A1 | 4/2013 | Reynolds et al. | |
| 2020/0021106 | A1 * | 1/2020 | Thibaut | G06F 1/26 |
| 2022/0173588 | A1 | 6/2022 | Gajanayake et al. | |
| 2022/0255335 | A1 | 8/2022 | Khozikov et al. | |
| 2022/0271513 | A1 | 8/2022 | Arduini et al. | |
| 2023/0170686 | A1 | 6/2023 | Kim et al. | |

FOREIGN PATENT DOCUMENTS

| | | | |
|---|---|---|---|
| CN | 110488205 | B | 2/2021 |
| CN | 114928123 | A | 8/2022 |
| CN | 115917902 | A | 4/2023 |
| DE | 60126843 | T2 | 11/2007 |
| DE | 102008038248 | A1 | 6/2009 |
| DE | 102012207624 | A1 | 11/2013 |
| FR | 2704686 | A1 | 11/1994 |
| IN | 202141015094 | A | 3/2021 |
| KR | 101584589 | B1 | 1/2016 |

* cited by examiner

SYSTEMS AND METHODS FOR DISTRIBUTING ELECTRIC POWER FROM A POWER DISTRIBUTION UNIT TO AN ELECTRIC LOAD

CROSS-REFERENCE

The present application claims priority to European Patent Appl. No. 23307232.1 filed Dec. 15, 2023 entitled "Systems and Methods for Distributing Electric Power From a Power Distribution Unit to an Electric Load", the entirety of which is incorporated herein by reference.

FIELD

The present technology relates to systems and methods for electric power distribution. In particular, systems and methods for distributing electric power from a power distribution unit to an electric load are disclosed.

BACKGROUND

A datacenter typically houses tens or hundreds of servers for load sharing and redundancy. Such large-scale server networks consume large amounts of electric power which makes electric power distribution a complex and error-prone task. In addition, demand for high-performing devices has led to a drastic increase of the amount of electric power distributed and consumed by standard electronic devices. Therefore, monitoring systems must be able to manage relatively high amount of electric power, which in turn increases the cost and the implementation complexity of monitoring systems.

Solutions for systems that enables safe distribution of electric power from a power source to an electric load in a cost-efficient manner is thus desirable.

SUMMARY

Embodiments and examples of the present technology have been developed based on developers' appreciation of shortcomings associated with the prior art.

In a first broad aspect of the present technology, there is provided a method for distributing electric power from a power distribution unit to an electric load. The method includes receiving, by a monitoring circuit, electric power from a power source, the monitoring circuit being electrically connected to the electric load. The method also includes connecting the electric load to a power outlet of the monitoring circuit and determining, by the monitoring circuit, an impedance at the power outlet. The method also includes in response to an impedance being effectively measured at the power outlet, determining, by the monitoring circuit, a status of the electric load. The status of the electric load is either in a failure state or in an operational state. The method also includes, in response to the electric load being in the operational state, inhibiting a short-circuit protection circuit of the monitoring circuit during a given amount of time after the connection of the electric load to the power outlet and distributing electric current from the power distribution unit to the electric load. The short-circuit protection circuit disconnects the electric load from the power distribution unit in response to a fault being detected.

In some non-limiting implementations, determining an impedance at a power outlet of the monitoring circuit includes employing an electrical impedance measuring component of the monitoring circuit to measure the impedance at the power outlet of the monitoring circuit. The monitoring circuit flags a presence of the electric load upon the electrical impedance measuring component effectively measuring an impedance.

In some non-limiting implementations, determining the status of the electric load includes employing the electrical impedance measuring component of the monitoring circuit to measure the impedance at the power outlet of the monitoring circuit. The monitoring circuit flags the status of the electric load as operational in response to the impedance being above an impedance threshold, and as a failure state otherwise.

In some non-limiting implementations, the electrical impedance measuring component is an ohmmeter.

In some non-limiting implementations, the amount of time is between 1 ms and 20 ms.

In some non-limiting implementations, distributing electric current from the power distribution unit to the electric load includes directing the electric current to the electric load through a current monitoring device of the short-circuit protection circuit. The current monitoring device emits a fault signal in response the electric current being above the current threshold. The short-circuit protection circuit disconnects the electric load from the power distribution unit in response to the current monitoring device emitting the fault signal.

In some non-limiting implementations, inhibiting the short-circuit protection circuit of the monitoring circuit comprises inhibiting the current monitoring device.

In some non-limiting implementations, the current monitoring device is an ammeter.

In some non-limiting implementations, the current monitoring device is a Hall effect sensor.

In some non-limiting implementations, the method further includes actuating a transistor assembly to enable distribution of the electric power from the monitoring circuit to the electric load.

In some non-limiting implementations, the electric load is a server.

In a second broad aspect of the present technology, there is provided a system for distributing electric power from a power distribution unit to an electric load. The system includes a power input for receiving electric power from a power source, a power outlet selectively electrically connected to the power input, the power outlet being configured to be connected to the electric load, a first electrical impedance measuring component configured to measure an impedance at the power outlet upon the electric load being connected to the power outlet and a second electrical impedance measuring component configured to, in response to the first electrical impedance measuring component effectively measuring an impedance at the power outlet, determine a status of the electric load, the status of the electric load being either in a failure state or in an operational state. The system also includes a short-circuit protection circuit electrically connected between the power inlet and the power outlet, the short-circuit protection circuit being enabled once a given amount of time has elapsed upon connection of the electric load to the power outlet and in response to the electric load being in the operational state. The short-circuit protection circuit disconnects the electric load from the power distribution unit in response to a fault being detected. The system also includes a transistor assembly that distributes electric current from the power distribution unit to the electric load in response to the electric load being in the operational state.

In some non-limiting implementations, the short-circuit protection circuit is further configured to disconnect the electric load from the power distribution unit in response to an electric current delivered to the electric load being above a power threshold.

In some non-limiting implementations, the first electrical impedance measuring component and the second electrical impedance measuring component are a same electrical impedance measuring component.

In some non-limiting implementations, the electrical impedance measuring component is an ohmmeter.

In some non-limiting implementations, the first electrical impedance measuring component flags a presence of the electric load upon effectively measuring an impedance at the power outlet.

In some non-limiting implementations, the second electrical impedance measuring component flags the status of the electric load as operational in response to the impedance being above an impedance threshold, and flag the status as failure state otherwise.

In some non-limiting implementations, the amount of time is between 1 ms and 20 ms.

In some non-limiting implementations, the short-circuit protection circuit includes a current monitoring component through which the electric current is directed. The current monitoring component emits a fault signal in response to the electric current being above the current threshold. The short-circuit protection circuit disconnects the electric load from the power distribution unit in response to the current monitoring component emitting the fault signal.

In some non-limiting implementations, the current monitoring component is an ammeter.

In some non-limiting implementations, the electric load is a server.

In the context of the present specification, an in-rush current refers to the momentary surge of current that occurs when an electric load is first turned on and receive electric power initially. This surge is typically higher than a steady-state or normal operating current that the device experiences once it is operating. In-rush current can occur in various types of electrical equipment, such as motors, transformers, power supplies, and other devices with capacitive or inductive components.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Embodiments and examples of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some examples of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Additional and/or alternative features, aspects and advantages of embodiments and examples of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

With these fundamentals in place, we will now consider some non-limiting examples to illustrate various implementations of aspects of the present technology.

Figure 1:
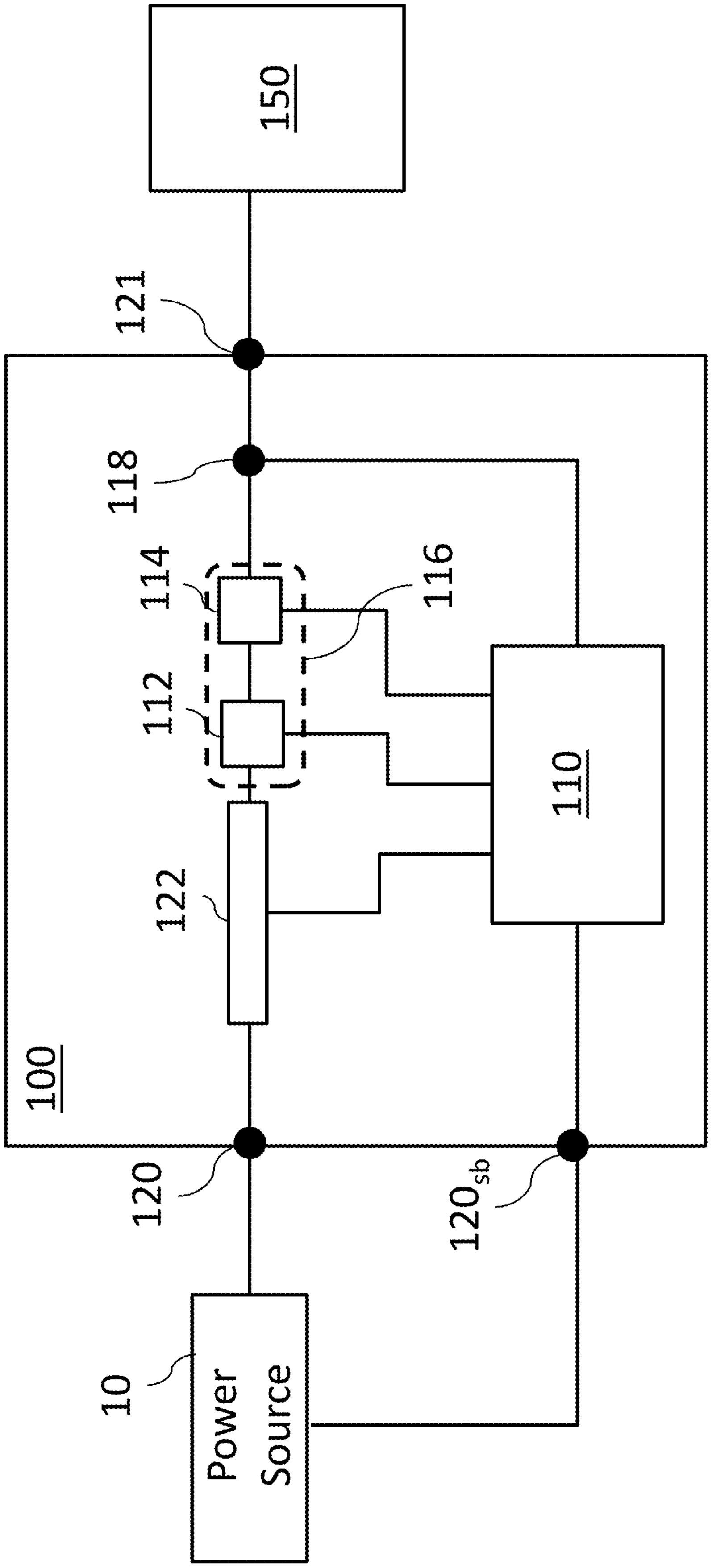
FIG. 1 is a schematic diagram of a monitoring circuit for distributing electric power from a power distribution unit to an electric load in accordance with non-limiting implementations of the present technology.

FIG. 1 is a schematic diagram of a monitoring circuit 100 for distributing electric power from a power distribution unit (PDU) 10 to an electric load 150. The PDU 10 may be a power source that provides one or more electric powers at different voltages. For example, the PDU 10 may provide a first electric power at 12V, a second electric power at 5V, a third electric power at 3.3V and a fourth electric at 12V standby, or "$12V_{sb}$". In this implementation, the monitoring circuit 100 further receives a standby electric power at a standby power input $120_{sb}$ from the PDU 10. The standby electric power is used to enable to local controller 110 and other components of the monitoring circuit 100 to operate before and during distribution of the electric power to the server 150. In this implementation, the standby electric power is $12V_{sb}$ but this aspect is not limitative.

For example, the electric load 150 may be an electronic device, such a server 150 of a datacenter. This aspect is not limitative. As such, any system variation configured to enable distribution of electric power from a power source to an electric load can be adapted to execute embodiments of the present technology, once teachings presented herein are appreciated. The load may be any other type of electronic device in alternative implementations of the present technology.

The server 150 may be implemented as a conventional computer server. In an example of an embodiment of the present technology, the server 150 may be implemented as a Dell™ PowerEdge™ Server running the Microsoft™ Windows Server™ operating system. Needless to say, the server 150 may be implemented in any other suitable hardware, software, and/or firmware, or a combination thereof. The server 150 may be provided with air cooling equipment, water cooling equipment or any other suitable cooling equipment that provides cooling to the electronic components of the server 150.

In this implementation, the monitoring circuit 100 directs the electric power from a power inlet 120 thereof to the server 150 and electronic components thereof, the server 150 being electrically connected to a power outlet 121 of the monitoring circuit 100. To do so, the monitoring circuit includes a local controller 110 and a transistor assembly 122 electrically connected between the power inlet 120 and the power outlet 121. The transistor assembly 122 may be electrically connected to the local controller 110. In this implementation, the transistor assembly 122 includes metal-oxide-semiconductor field-effect transistors (MOSFETs) used as an electric switching device. It should be noted that two or more power inputs 120 may receive a same electric power (e.g. 12V) from the PDU 10.

The monitoring circuit also includes a short-circuit protection circuit 116 used to disconnect the PDU 10 from the server 150 in case of electric failure occurring during distribution of the electric power. In this implementation, the short-circuit protection circuit 116 includes a current monitoring device 112 and a fuse assembly 114. A state of the fuse assembly 114 may actively monitored by the local controller 110 which may, in response to a fuse being in a failure state, disconnect the server 150 from the PDU 10 to prevent any additional damages from occurring to the server 150 and/or the PDU 10 and other equipment electrically connected therewith. Alternatively, the fuse assembly 114 may disconnect the server 150 from the PDU 10 in response to the current monitoring device 112 emits a fault signal. In these implementations, the current monitoring device 112 emits a fault signal in response to the electric power being above a pre-determined current threshold. In the event of a short circuit on another server electrically connected to the PDU 10, it may be important that the PDU 10 is not overloaded and can continue to supply power to the other servers (i.e. to avoid propagation of the failure).

In some implementations, the current monitoring device 112 is an ammeter. For example, the current monitoring device 112 may be a hall effect sensor.

The monitoring circuit 100 also includes an electrical impedance measuring component 118 configured to measure an impedance at the power outlet 121 upon the server 150 being connected to the power outlet 121.

In this implementation, the local controller 110 may also determine, based on signals measured by the electrical impedance measuring component 118 and in response to the electrical impedance measuring component 118 effectively measuring an impedance at the power outlet 121, a status of the server 150. The status of the server 150 may be either in a failure state or in an operational state. The transistor assembly 122 may be actuated to effectively enable distribution of the electric power to the server 150 based on signals measured by the current monitoring device 112 and the electrical impedance measuring component 118.

Broadly speaking, the monitoring circuit 100 first determines presence of the server 150 at the power outlet 121 using the electrical impedance measuring component 118. The monitoring circuit 100 further determine a state of the server 150 using the electrical impedance measuring component 118. Different electrical impedance measuring components may be used to perform these two actions in alternative implementations. If the server 150 is present and in an operational state, namely that there is no short-circuit occurring therein, any sudden variation of the electric power at the power outlet 121 upon initial reception of the electric power by the server 150 could be considered as an in-rush current or a neglectable variation, and not as a short-circuit occurrence. As will be described in greater details herein after, the short-circuit protection circuit 122 is inhibited during a pre-determined amount of time such that any occurrence of in-rush current would not be detected and thus would not cause undesirable disconnection of the server 150 from the PDU 10.

The short-circuit protection circuit 122 is further re-enabled once the pre-determined amount of time has elapsed such that, after any potential occurrence of in-rush current, the server 150 is still protected from short-circuit occurrences. This may enable usage of cheaper transistors in the distribution of the electric power. For example, some standard technologies rely on transistors that permit transmission of 80 A for a steady-state current of 8 A due to potential occurrences of in-rush currents. The present technology enables the use of transistors that permit transmission of up to 10 A to 15 A for the same steady-state current, thereby reducing the size and cost of the electronic components. It should also be noted that, given that the size of the transistors is reduced relatively to other standard technologies, a cooling of the component is thus enhanced and facilitated, which increases a robustness of the electronic assembly.

Figure 2:
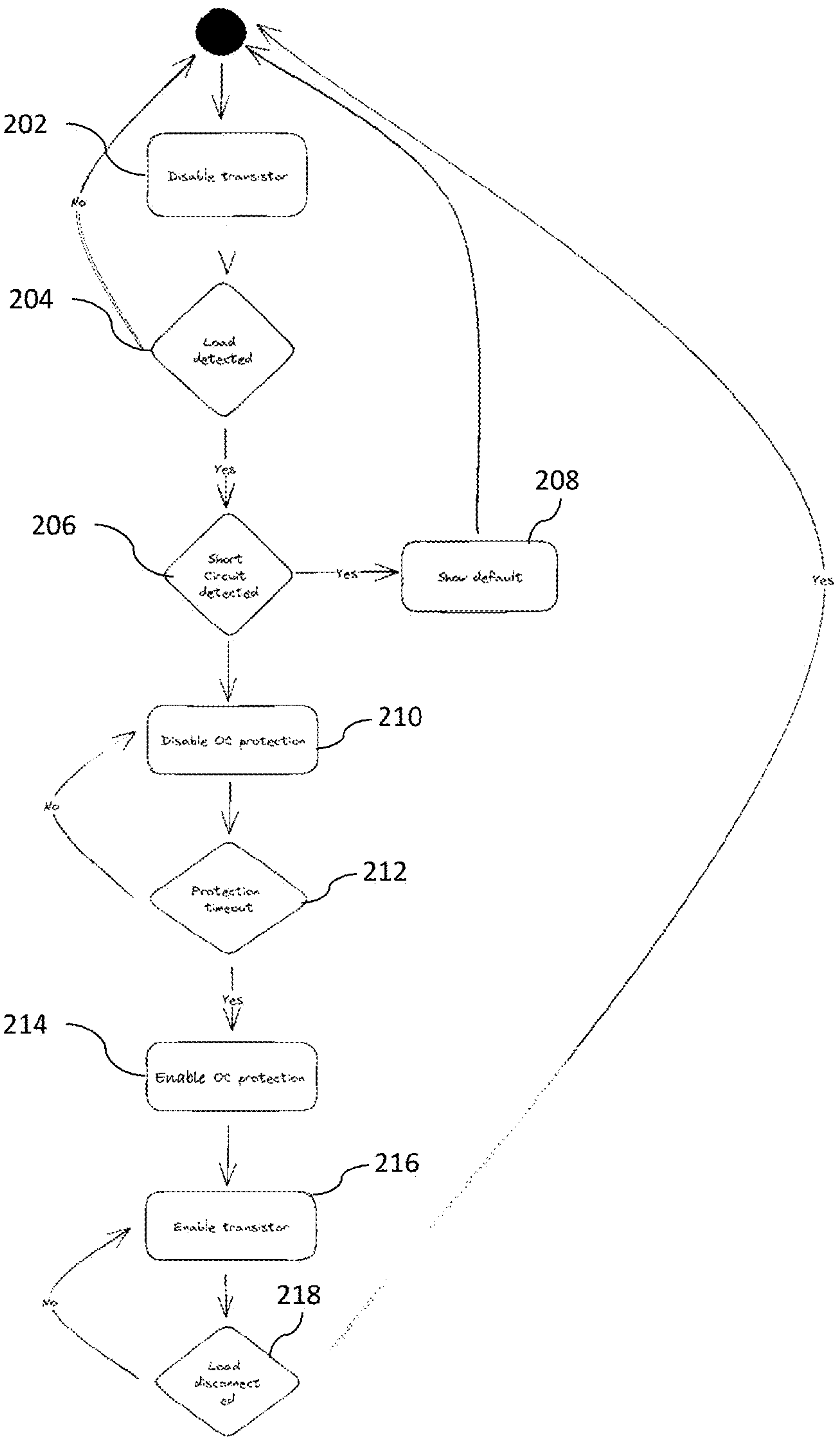
FIG. 2 is a flow diagram of a pipeline for distributing electric power from a power distribution unit to an electric load in accordance with non-limiting implementations of the present technology.

FIG. 2 is a flow diagram of an illustrative pipeline 200 for distributing electric power from a power distribution unit to an electric load. At block 202 the fuse assembly 114 is disabled such that the electric power cannot be distributed to the server 150.

At block 204, the electrical impedance measuring component 118 determines whether or not the server 150 is present at the power outlet 121. For example, the electrical impedance measuring component 118 may include an ohmmeter and the server 150 is flagged as present in response to a resistance value (even a null value) being detected by the ohmmeter. In response to the server 150 being present at the power outlet 121, the electrical impedance measuring component 118 further determines a status of the server 150 at block 206. More specifically, the local controller 110 determines whether or not a short-circuit is occurring at the server 150 based on signals measured by the electrical impedance measuring component 118. The server 150 is flagged in the failure state at block 208 in response to a resistance measured being null or near zero, and flagged in the operational state otherwise (e.g. in response to said resistance being above a pre-determined threshold).

Once the server 150 has been detected in the operational state, the short-circuit protection circuit 116 is inhibited, or "disabled", at block 210. In some implementations, the fuse assembly 114 is inhibited at block 210. In some other implementations where the local controller 110 may actively inhibit the fuse assembly 114 in response to signals provided by the current monitoring device 112, the current monitoring device 112 is inhibited at block 210.

At block 212, a timer is started such that the short-circuit protection circuit 116 is inhibited until a pre-determined amount of time has elapsed after the server 150 is detected at the power output 121. This may prevent any occurrence of in-rush current to be detected, or "identified" as a short-circuit occurrence by the short-circuit protection circuit. The short-circuit protection circuit 116 is further enabled at block 214 once the pre-determined amount of time has elapsed and the transistor assembly 122 is actuated at block 114 to enable distribution of the electric power to the server 150 at block 216.

In circumstances where short circuit is detected and/or when detection is made that the server 150 is disconnected from the power outlet 121 based on signal provided by the electrical impedance measuring component 118 at block 218, the fuse assembly 114 is actuated to prevent electric power from being directed to the server 150.

Figure 3:
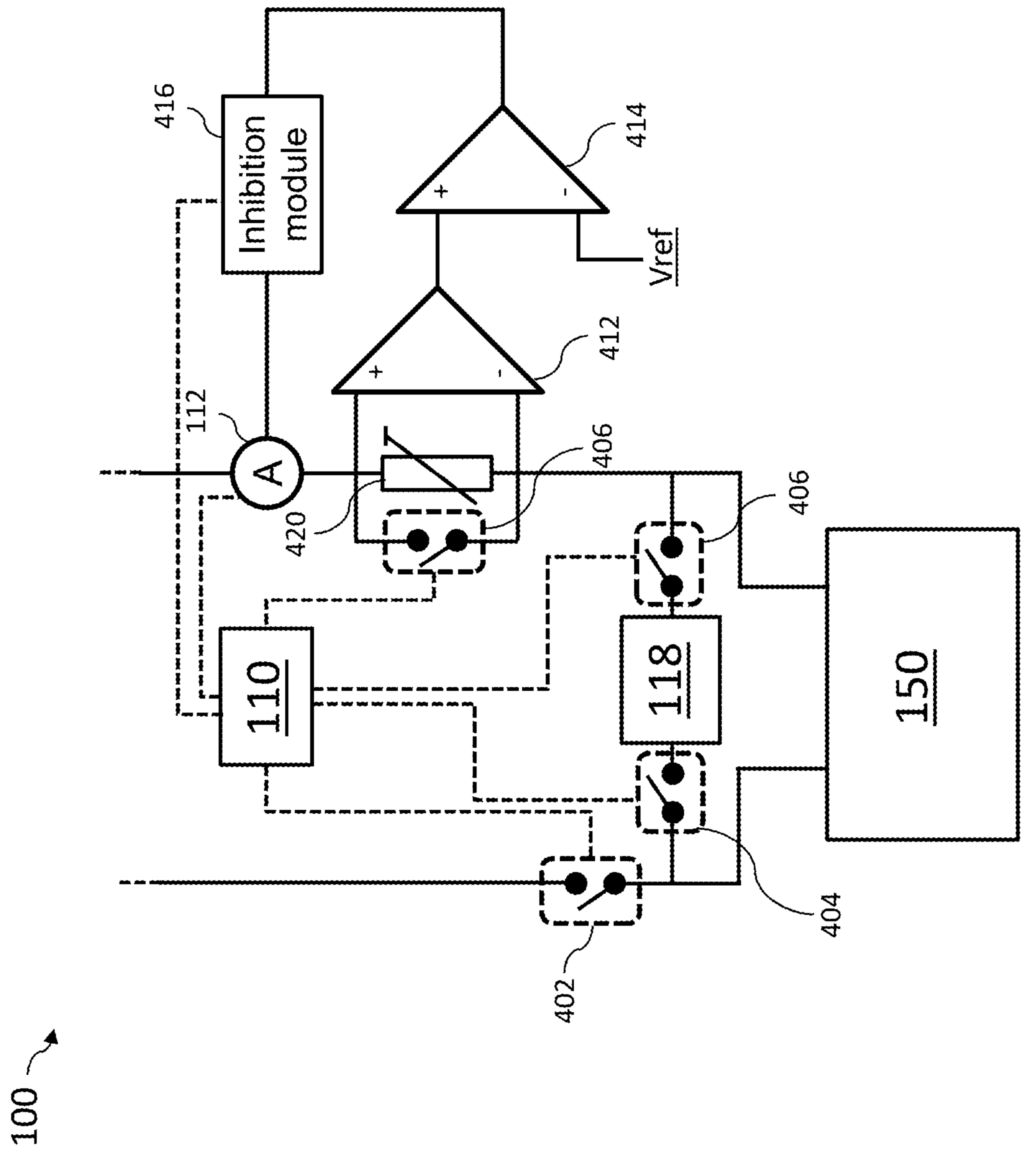
FIG. 3 is an electric diagram of the monitoring circuit of FIG. 1 in accordance with non-limiting implementations of the present technology.

FIG. 3 is an electric diagram of the monitoring circuit 100, in accordance with non-limiting implementations of the present technology. As previously described, the electrical impedance measuring component 118 is connected at the server 150 to measure an impedance thereof. More specifically, the monitoring circuit 100 includes a first switching device 404 and a second switching device 406 to selectively connect the electrical impedance measuring component 118 to the server 150 and controlled by the local controller 110. In use, the first and second switching devices 404, 406 may be switched in a closed configuration to connect the electrical impedance measuring component 118 to the server 115 and cause the electrical impedance measuring component 118 to measure an impedance thereof.

The local controller 110 determines, based on the signals measured by the electrical impedance measuring component 118, the presence of the server 150 at the power outlet 121. In this implementation, the presence is assessed in response to the electrical impedance measuring component 118 effectively measuring an impedance.

Once the presence is determined, the local controller 110 also determine a status of the server 115. In this implementation, the server 150 is identified as being in an operational status in response to the measured impedance being above a pre-determined threshold (e.g. 0.01 Ohm), and in a failure state otherwise.

Once the server 150 is identified as being in the operational state, the local controller 110 actuates a switching device 402 in a closed configuration that would enable distribution of electric power to the server 150. It should be noted that, at this stage, electric power is not yet distributed to the server 150, but relatively small amounts of electric charges may circulate from the PDU 10 to the server 150. The local controller 110 may also actuate the switching devices 404 and 406 in the open configuration to disconnect the electrical impedance measuring component 118 from the server 150.

In this implementation, a voltage at a shunt resistor 420 is amplified by a first operational amplifier 412 and further compared to a reference voltage noted "Vref" by a second operational amplifier 414. For example, Vref may be equal to 1.23V. In some other implementations, a thermistor may be used instead of the shunt resistor 420. A current-imaging voltage shunt or equivalent with a non-limiting bandwidth (e.g. 10 MHz) may also be used instead of the shunt resistor 420.

In response to the amplified voltage of the shunt resistor 420 being above the reference voltage, the local controller 110 starts a timer of a pre-determined amount of time during which the current monitoring device 112 will be inhibited. The timer is visually depicted on FIG. 3 as an inhibition module 416 executed by the local controller 110 in response to the amplified voltage of the shunt resistor 420 being above the reference voltage Vref. Therefore, the current monitoring device 112 cannot emit a fault signal while the pre-determined amount of time has not elapsed.

In alternative implementation, the fuse assembly 114 is inhibited (i.e. cannot cause disconnection of the server 150 from the PDU 10) instead of the current monitoring device 112.

Once the pre-determined amount of time has elapsed, a switching device 406 may be switched in a closed configuration by the local controller 110 to bypass the shunt resistor 420 and the current monitoring device 112 is re-enabled. Therefore, any variation of the current above the pre-determined current threshold will be detected by the current monitoring device 112 once the pre-determined amount of time has elapsed.

Figure 4:
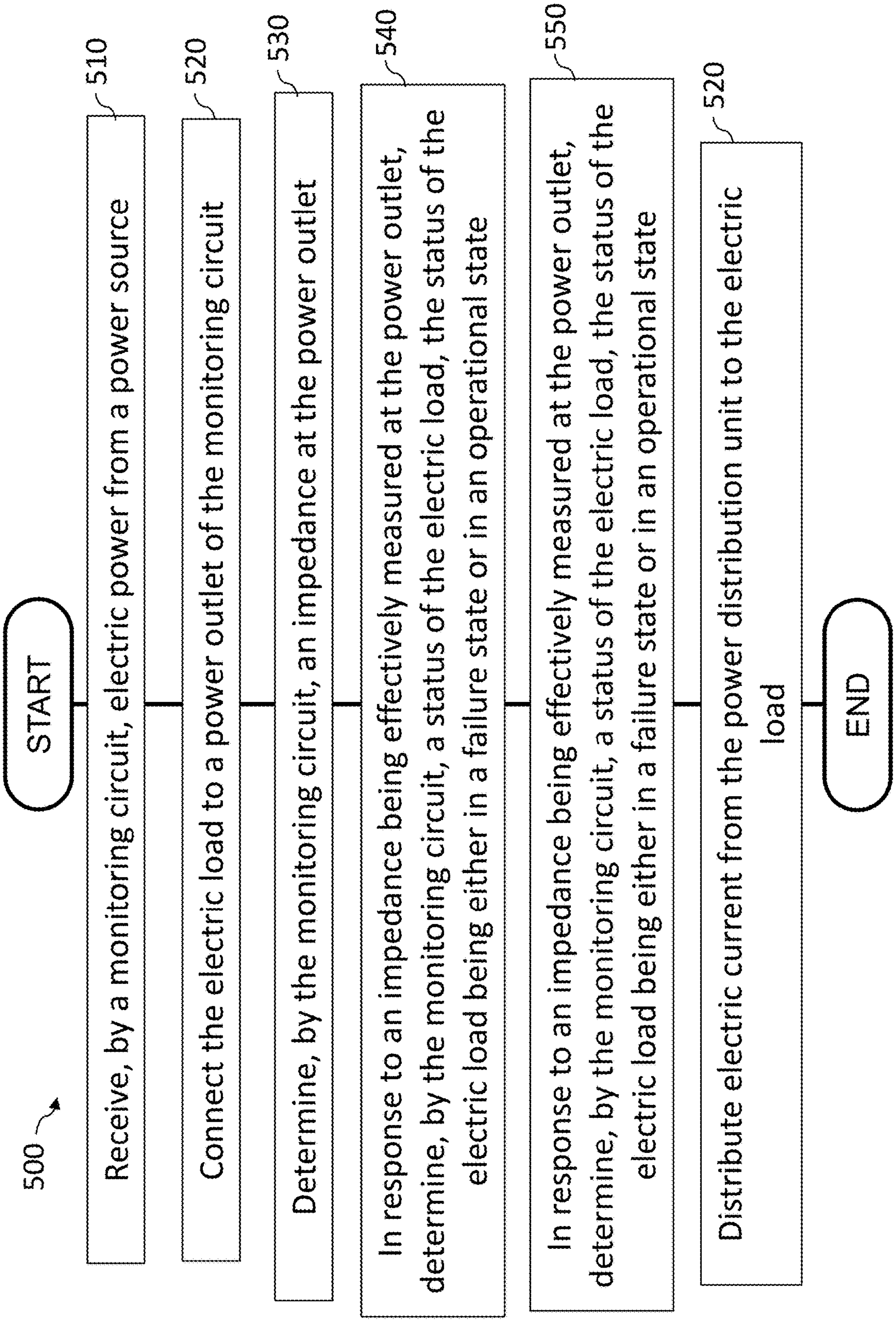
FIG. 4 illustrates a flow diagram showing operations of a method for distributing electric power from a power distribution unit to an electric load in accordance with non-limiting implementations of the present technology.

FIG. 4 is a flow diagram of a method 500 for distributing electric power from a power distribution unit to an electric load according to some examples of the present technology. In one or more aspects, the method 500 or one or more steps thereof may be performed by a processor or a computer system, in the present example by the local controller 110. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 500 starts with receiving, at operation 510, electric power from a PDU (e.g. the PDU 10) by a monitoring circuit, the monitoring circuit being electrically connected to the electric load. The monitoring circuit may be the monitoring circuit 100 and the electric load may be the server 150.

The method 500 continues with connecting, at operation 520, the electric load to a power outlet of the monitoring circuit.

The method 500 continues with determining, at operation 530, an impedance at the power outlet. In some implementations, the impedance is determined by employing an electrical impedance measuring component of the monitoring circuit to measure the impedance at the power outlet of the monitoring circuit. The monitoring circuit is configured to flag a presence of the electric load upon the electrical impedance measuring component effectively measuring an impedance.

The method 500 continues with determining, at operation 540, in response to an impedance being effectively measured at the power outlet, a status of the electric load. The status of the electric load may be either in a failure state or in an operational state. In this implementation, the status of the electric load is determined by employing the electrical impedance measuring component of the monitoring circuit to measure the impedance at the power outlet of the monitoring circuit. The monitoring circuit flags the status of the electric load as operational in response to the impedance being above an impedance threshold, and as a failure state otherwise. For example, the electrical impedance measuring component may be an ohmmeter.

The method 500 continues with inhibiting, at operation 550 and in response to the electric load being in the operational state, a short-circuit protection circuit of the monitoring circuit during a given amount of time after the connection of the electric load to the power outlet. The short-circuit protection circuit may be implemented as the short-circuit protection circuit 112. For example and without limitation, the amount of time may be between 1 ms and 20 ms. In use, the short-circuit protection circuit is configured to disconnect the electric load from the power distribution unit in response to a fault being detected.

In some implementations, inhibiting the short-circuit protection circuit of the monitoring circuit includes inhibiting a current monitoring device of the short-circuit protection circuit. In use, the current monitoring device emits a fault signal, when not inhibited, in response the electric current being above the current threshold, the short-circuit protection circuit being configured to disconnect the electric load from the power distribution unit in response to the current monitoring device emitting the fault signal. For example, the current monitoring device may be an ammeter.

The method 500 continued with distributing, at operation 560, electric current from the power distribution unit to the electric load. In this implementation, distributing electric current from the power distribution unit to the electric load includes directing the electric current to the electric load through a current monitoring device of the short-circuit protection circuit.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

As an example, FIG. 8 is a schematic block diagram of the local controller 110 of the monitoring circuit 100 according to an example of the present technology. The local controller 110 includes a processor or a plurality of cooperating processors (represented as a processor 810 for simplicity), a memory device or a plurality of memory devices (represented as a memory device 830 for simplicity), and an input/output interface 820 allowing the local controller 110 to communicate with other components of the monitoring circuit 100 and/or other components in communication with the monitoring circuit 100 such as the transistor assembly 122, the short-circuit protection circuit 116 and the electrical impedance measuring component 118. The processor 810 is operatively connected to the memory device 830 and to the input/output interface 820. The memory device 830 includes a storage for storing parameters 834. The memory device 830 may comprise a non-transitory computer-readable medium for storing code instructions 832 that are executable by the processor 810 to allow the local controller 110 to perform the various tasks allocated to the local controller 110 described herein.

Figure 5:
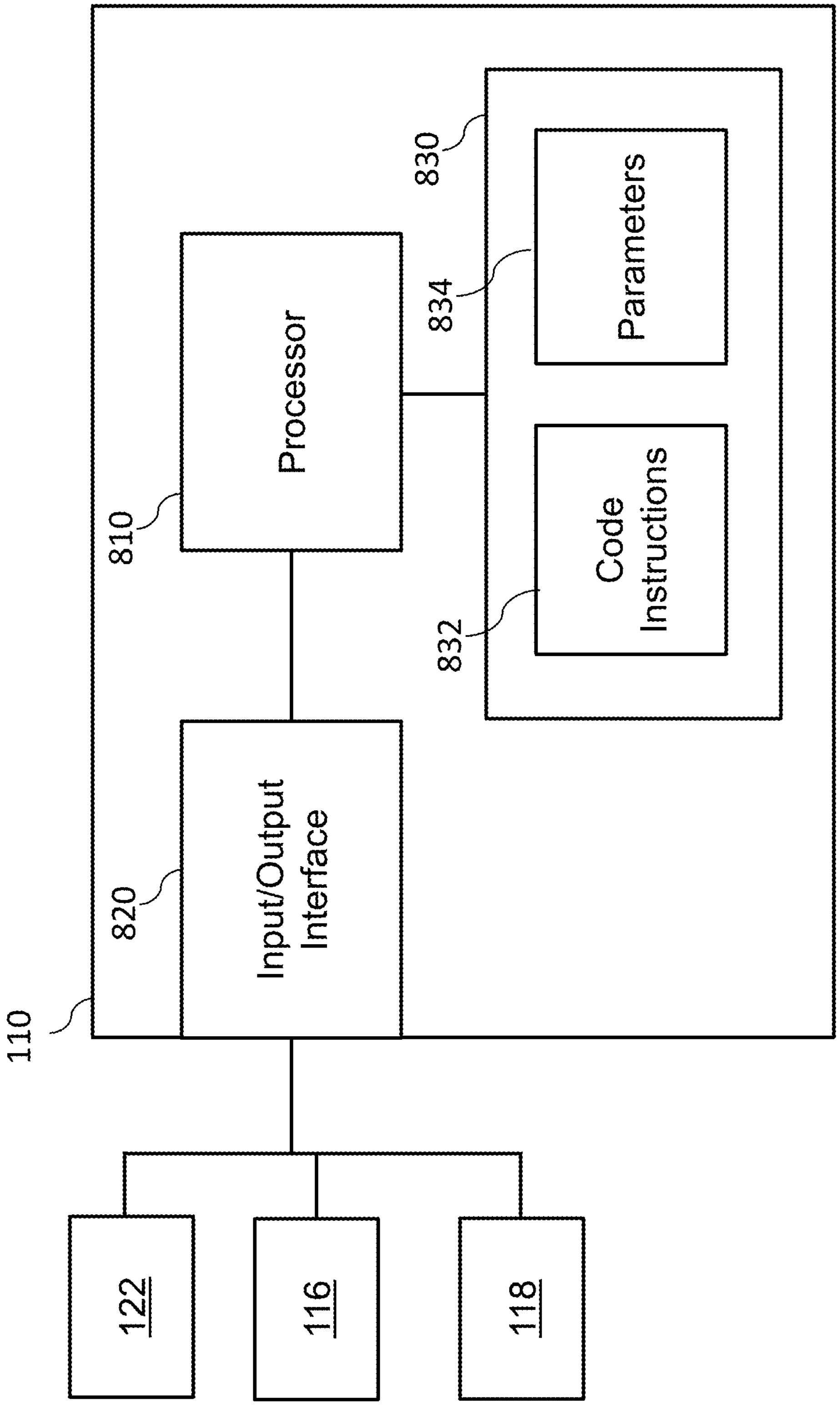
FIG. 5 is a block diagram of a controller in accordance with non-limiting implementations of the present technology.

The local controller 110 executes the code instructions 832 stored in the memory device 830 to implement the various above-described functions that may be present in a particular example. FIG. 5 as illustrated represents a non-limiting example in which the local controller 110 orchestrates operations of the monitoring circuit 100. This particular example is not meant to limit the present disclosure and is provided for illustration purposes. It should be noted that, in this implementation, the local controller 110 may be implemented directly on the server 150.

It is to be understood that the operations and functionality of the described monitoring circuit 100, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every example of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for distributing electric power from a power distribution unit to an electric load, the method comprising:

receiving, by a monitoring circuit, electric power from the power distribution unit, the monitoring circuit being electrically connected to the electric load;

connecting the electric load to a power outlet of the monitoring circuit;

determining, by the monitoring circuit, an impedance at the power outlet;

in response to an impedance being effectively measured at the power outlet, determining, by the monitoring circuit, a status of the electric load, the status of the electric load being either in a failure state or in an operational state; and in response to the electric load being in the operational state:

inhibiting a short-circuit protection circuit of the monitoring circuit during a given amount of time after the connection of the electric load to the power outlet, the short-circuit protection circuit being configured to disconnect the electric load from the power distribution unit in response to a fault being detected; and distributing electric current from the power distribution unit to the electric load.

2. The method of claim 1, wherein determining an impedance at a power outlet of the monitoring circuit comprises:

employing an electrical impedance measuring component of the monitoring circuit to measure the impedance at the power outlet of the monitoring circuit, the monitoring circuit being configured to flag a presence of the electric load upon the electrical impedance measuring component effectively measuring an impedance.

3. The method of claim 2, wherein determining the status of the electric load comprises:

employing the electrical impedance measuring component of the monitoring circuit to measure the impedance at the power outlet of the monitoring circuit, the monitoring circuit being configured to flag the status of the electric load as operational in response to the impedance being above an impedance threshold, and as a failure state otherwise.

4. The method of claim 2, wherein the electrical impedance measuring component is an ohmmeter.

5. The method of claim 1, wherein the given amount of time is between 1 ms and 20 ms.

6. The method of claim 1, wherein distributing electric current from the power distribution unit to the electric load comprises:

directing the electric current to the electric load through a current monitoring device of the short-circuit protection circuit, the current monitoring device being configured to emit a fault signal in response to the electric current being above a current threshold, the short-circuit protection circuit being configured to disconnect the electric load from the power distribution unit in response to the current monitoring device emitting the fault signal.

7. The method of claim 6, wherein inhibiting the short-circuit protection circuit of the monitoring circuit comprises inhibiting the current monitoring device.

8. The method of claim 6, further comprising:
actuating a transistor assembly to enable distribution of the electric power from the monitoring circuit to the electric load.

9. A non-transitory computer-readable medium comprising computer-readable instructions that, upon being executed by a system, cause the system to perform the method of claim 1.

10. A system for distributing electric power from a power distribution unit to an electric load, the system comprising:
a power input for receiving electric power from a power source;
a power outlet selectively electrically connected to the power input, the power outlet being configured to be connected to the electric load;
a first electrical impedance measuring component configured to measure an impedance at the power outlet upon the electric load being connected to the power outlet;
a second electrical impedance measuring component configured to, in response to the first electrical impedance measuring component effectively measuring an impedance at the power outlet, determine a status of the electric load, the status of the electric load being either in a failure state or in an operational state;
a short-circuit protection circuit electrically connected between the power input and the power outlet, the short-circuit protection circuit being enabled once a given amount of time has elapsed upon connection of the electric load to the power outlet and in response to the electric load being in the operational state, the short-circuit protection circuit being configured to disconnect the electric load from the power distribution unit in response to a fault being detected; and
a transistor assembly configured to distribute electric current from the power distribution unit to the electric load in response to the electric load being in the operational state.

11. The system of claim 10, wherein the short-circuit protection circuit is further configured to disconnect the electric load from the power distribution unit in response to an electric current delivered to the electric load being above a power threshold.

12. The system of claim 10, wherein the first electrical impedance measuring component is configured to flag a presence of the electric load upon effectively measuring an impedance at the power outlet.

13. The system of claim 12, wherein the second electrical impedance measuring component is configured to flag the status of the electric load as operational in response to the impedance being above an impedance threshold, and flag the status as failure state otherwise.

14. The system of claim 10, wherein the given amount of time is between 1 ms and 20 ms.

15. The system of claim 10, wherein the short-circuit protection circuit comprises:
a current monitoring component through which the electric current is directed, the current monitoring component being configured to emit a fault signal in response to the electric current being above a current threshold, the short-circuit protection circuit being configured to disconnect the electric load from the power distribution unit in response to the current monitoring component emitting the fault signal.

* * * * *